United States Patent
Bae et al.

(10) Patent No.: US 10,263,824 B2
(45) Date of Patent: Apr. 16, 2019

(54) METHOD AND DEVICE FOR ESTIMATING FREQUENCY OFFSET OF RECEPTION SIGNAL

(71) Applicant: Samsung Electronics Co., Ltd., Suwon-si, Gyeonggi-do (KR)

(72) Inventors: Youngtaek Bae, Suwon-si (KR); Hayoung Yang, Yongin-si (KR); Joohyun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/948,797

(22) Filed: Nov. 23, 2015

(65) Prior Publication Data

US 2016/0156493 A1 Jun. 2, 2016

(30) Foreign Application Priority Data

Nov. 28, 2014 (KR) .......................... 10-2014-0168987

(51) Int. Cl.
*H04L 27/26* (2006.01)
*H04L 5/00* (2006.01)
*H04J 13/00* (2011.01)

(52) U.S. Cl.
CPC ........ *H04L 27/266* (2013.01); *H04L 27/2657* (2013.01); *H04J 13/0062* (2013.01); *H04L 5/001* (2013.01); *H04L 5/0048* (2013.01); *H04L 27/2675* (2013.01); *H04L 27/2684* (2013.01)

(58) Field of Classification Search
CPC ..... H04L 27/266; H04L 27/265; H04L 5/023; H04L 27/2657; H04L 2027/0065; H04L 27/2659

See application file for complete search history.

(56) References Cited

U.S. PATENT DOCUMENTS

| 7,843,970 | B2 | 11/2010 | Yang | |
|---|---|---|---|---|
| 2007/0171889 | A1* | 7/2007 | Kwon | H04L 5/0005 370/350 |
| 2008/0232516 | A1* | 9/2008 | Cheng | H04L 5/023 375/344 |
| 2008/0310561 | A1* | 12/2008 | Song | H04L 27/265 375/343 |
| 2008/0318567 | A1* | 12/2008 | Popovic | H04L 27/2655 455/422.1 |
| 2009/0046671 | A1* | 2/2009 | Luo | H04J 11/0069 370/336 |
| 2010/0020905 | A1* | 1/2010 | Mansour | H04J 13/0062 375/343 |
| 2010/0080112 | A1* | 4/2010 | Bertrand | H04L 27/2675 370/208 |

(Continued)

*Primary Examiner* — Aristocratis Fotakis
(74) *Attorney, Agent, or Firm* — Jefferson IP Law, LLP (57) ABSTRACT

A method for estimating a frequency offset of a reception signal and, more particularly, a signal processing method which can be applied to a receiver modem in a wireless communication system, are provided. The method includes using an absolute value within a specific time area in an inverse discrete fourier transform (IDFT) output of a decorrelation signal between a reception signal and a reference signal, and enabling a highly approximate estimation of a frequency offset through only a single decorrelation test using a characteristic of a predetermined permutation of a signal.

12 Claims, 5 Drawing Sheets

(56) References Cited

U.S. PATENT DOCUMENTS

| | | | |
|---|---|---|---|
| 2010/0110873 A1* | 5/2010 | Han | H04J 13/0062 370/208 |
| 2012/0287874 A1* | 11/2012 | Oketani | H04L 27/0014 370/329 |
| 2013/0170590 A1* | 7/2013 | Hyll | H04L 27/0014 375/343 |
| 2014/0056262 A1* | 2/2014 | Shimomura | H04L 5/0007 370/329 |

* cited by examiner

METHOD AND DEVICE FOR ESTIMATING FREQUENCY OFFSET OF RECEPTION SIGNAL

CROSS-REFERENCE TO RELATED APPLICATION(S)

This application claims the benefit under 35 U.S.C. § 119(a) of a Korean patent application filed on Nov. 28, 2014 in the Korean Intellectual Property Office and assigned Serial No. 10-2014-0168987, the entire disclosure of which is hereby incorporated by reference.

TECHNICAL FIELD

The present disclosure relates to a method for estimating a frequency offset of a reception signal. More particularly, the present disclosure relates to a method for processing a signal, which can be applied to a receiver modem in a wireless communication system.

BACKGROUND

An orthogonal frequency division multiplexing (OFDM) scheme is a scheme for multi-carrier modulation. Use of the OFDM scheme enables sub-carrier overlapping using multiple sub-carriers which are orthogonal to each other. As a result, the use of the OFDM can raise efficiency in terms of transmitting a signal. Further, an OFDM system is a block unit-based transmission scheme being considered in preparation for a multi-path environment of a broadband wireless channel having a relatively long delay spread. Thus, an OFDM system enables equalization of a selective fading channel by frequency according to multiple paths through simple calculation of the product of complex numbers in a frequency area. Further, in order to avoid interference within a block and interference between blocks, an OFDM system has a characteristic in that a cyclic prefix (CP), longer than a maximum delay path of a channel, is inserted into the OFDM system.

Having such characteristics, OFDM is currently used as a core modulation scheme in various wireless communication system standards, such as wireless broadband (WiBro), wireless local area network (WLAN), wireless personal area network (WPAN), and 3rd generation partnership project long-term evolution (3GPP LTE).

However, since an OFDM system has a relatively small frequency interval between sub-carriers in comparison with the transmission band thereof and is required to maintain the orthogonality among sub-carriers at the time of transmission, the OFDM system is more sensitive to a frequency offset than a single carrier system. When a frequency offset is generated due to an oscillator mismatch or a Doppler frequency shift between transmitters and receivers, the reception performance may largely deteriorate. Thus, it is required to precisely estimate and compensate for a frequency offset in an OFDM system.

A proposed method for estimating a frequency offset according to the related art includes a scheme for estimation using a differential modulation method in a frequency area, and a scheme using a phase difference using autocorrelation among identical symbols when there are the identical symbols spaced a predetermined distance apart from the frequency area.

There is another method that estimates a frequency offset through decorrelation between a reference signal and a reception signal. A more detailed description thereof will be given below. First, a frequency offset between a reference signal, i.e. a transmission signal, and a reception signal is assumed. Next, a predetermined permutation is extracted from the reference signal in the time area. The predetermined extracted permutation is multiplied by a phase shift value in the time area, which corresponds to the assumed frequency offset, for each sequence index of the permutation. The predetermined permutation of the reference signal, which has been multiplied by the phase shift value, is subjected to a discrete fourier transform (DFT) to be converted into a signal of a frequency area.

Next, a decorrelation signal between the converted frequency area signal and a DFT input of the reception signal is calculated. Here, decorrelation refers to an operation of performing conjugate multiplication on two DFT outputs in a sample-by-sample manner. Conjugate multiplication on two sequences having the length of N is defined by Equation 1 below.

$$\sum_{i=0}^{N-1} x_i (y_i)^* \qquad \text{Equation 1}$$

The calculated decorrelation signal is subjected to an inverse DFT (IDFT) again to be converted into a signal in the time area. Finally, a frequency offset value allowing a peak value extracted from a signal of the time area of the decorrelation signal to be at a maximum is obtained while changing the assumed frequency offset value. This method has a large complexity because it requires a process of repeatedly calculating a decorrelation signal to reversely obtain a frequency offset that maximizes the peak value.

The number of times by which a decorrelation signal for the assumed frequency offset is obtained may be determined on the basis of an interval of a permutation used for correlation calculation and an incremental step size configuration. In this case, the calculation of a DFT/IDFT, etc. is required to be performed multiple times, which may increase the complexity and thus make it difficult to implement a reception device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and device for estimating a frequency offset using an absolute value within a specific time area in an inverse discrete fourier transform (IDFT) output of a decorrelation signal between a reception signal and a reference signal.

In accordance with an aspect of the present disclosure, a method for estimating a frequency offset of a reception signal by a reception device in a mobile communication system is provided. The method includes determining a correlation relationship between the reception signal and a reference signal in a time area, acquiring a predetermined maximum value in at least one interval from a spectrum on the basis of the determined correlation relationship, and estimating a frequency offset on the basis of the acquired maximum value.

In accordance with another aspect of the present disclosure, a reception device for estimating a frequency offset of a reception signal in a mobile communication system is provided. The reception device includes a communication unit configured to receive a signal from a transmission device, and a control unit configured to determine a correlation relationship between the reception signal and a reference signal in a time area, acquire a predetermined maximum value in at least one interval from a spectrum on the basis of the determined correlation relationship, and estimate a frequency offset on the basis of the acquired maximum value.

The present disclosure relates to a method for estimating a frequency offset using an absolute value in an IDFT output of a decorrelation signal between a reception signal and a reference signal, and enables a highly approximate estimation of a frequency offset through only a single decorrelation test using a characteristic of a predetermined permutation of a signal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

And each block of the flowchart illustrations may represent a module, a segment, or a portion of code, which includes one or more executable instructions for implementing the specified logical function(s). It should also be noted that in some alternative implementations, the functions noted in the blocks may occur out of the order that is illustrated. For example, two blocks shown in succession may in fact be executed substantially concurrently or the blocks may sometimes be executed in the reverse order, depending upon the functionality involved.

As used herein, a "unit" or "module" refers to a software element or a hardware element, such as a field programmable gate array (FPGA) or an application specific integrated circuit (ASIC), which performs a predetermined function. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more central processing units (CPUs) within a device or a security multimedia card.

In the present disclosure, a reception device is used for extracting a predetermined permutation of a reception signal and estimating a frequency offset. The predetermined permutation used for applying a method for estimating a frequency offset in the present disclosure may include a Zadoff-Chu permutation. Hereinafter, the Zadoff-Chu permutation will be described as an example of the predetermined permutation. However, the present disclosure is not limited to the Zadoff-Chu permutation, and proposes a method of using a predetermined permutation having a characteristic to which the present disclosure can be applied.

The Zadoff-Chu permutation is a permutation of complex values used in order to obtain an electromagnetic signal (for example, a demodulation reference signal). The Zadoff-Chu permutation may be based on a root permutation including two parameters (for example, a root index and a cyclic shift). Signals, which are obtained from Zadoff-Chu permutations generated using identical root permutations and different cyclic shifts, respectively, have a characteristic in that the signals are orthogonal to each other.

The Zadoff-Chu permutation is a permutation widely used in a long-term evolution (LTE) system, and may be used for primary synchronization signals, uplink reference signals, a physical uplink control channel (PUCCH) channel, a random access channel, and the like. The uplink reference signals include a demodulation reference signal (DMRS) and a sound reference signal (SRS). The two signals use a Zadoff-Chu permutation but have a problem in that the lengths of the signals are not a fraction due to cyclic extension. In this case, extracting only a part corresponding to a fraction and applying an algorithm of the present disclosure with the Zadoff-Chu permutation makes it possible to estimate a frequency offset. In the above case, $1/T_{SEQ}=15000$ $H_z$.

Figure 1:
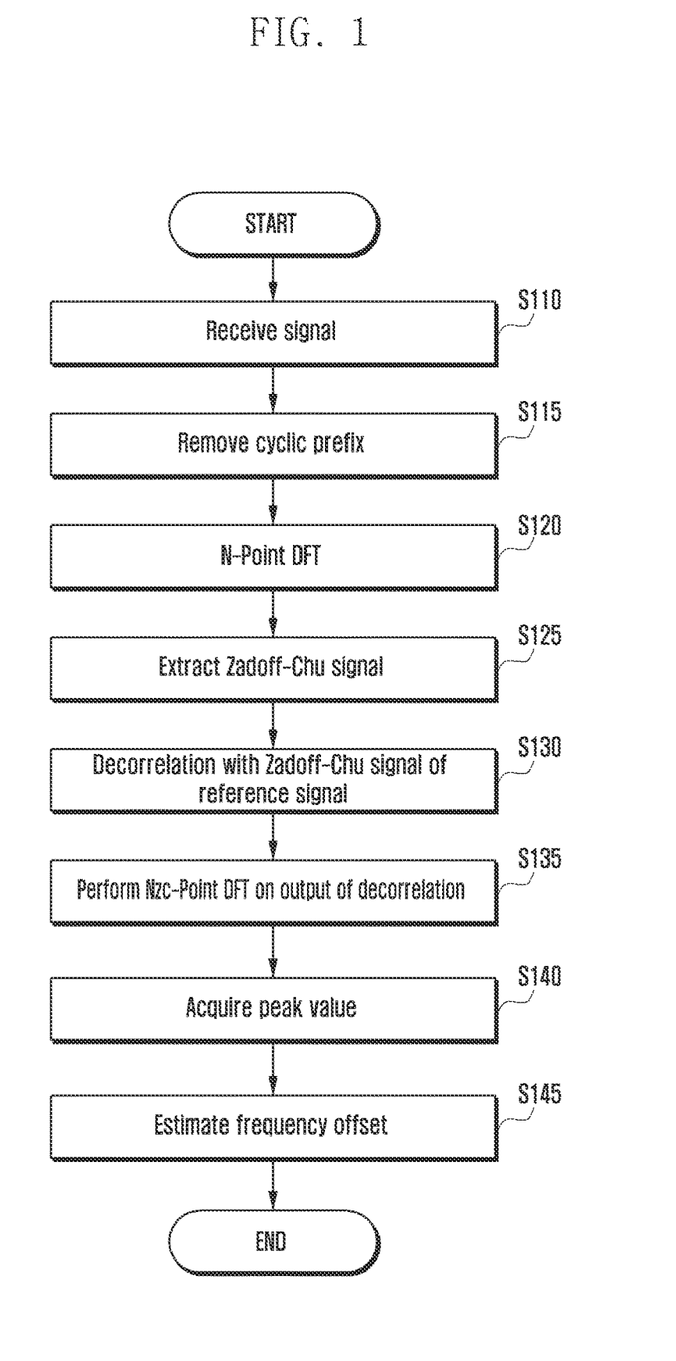
FIG. 1 is a flowchart illustrating a process of estimating a frequency offset by a reception device according to an embodiment of the present disclosure.

FIG. 1 is a flowchart illustrating a process of estimating a frequency offset by a reception device according to an embodiment of the present disclosure.

Referring to FIG. 1, a reception device receives a signal from a transmission device in operation S110. The reception device removes a cyclic prefix (CP) of the received signal in order to estimate a frequency offset in operation S115. The reception device performs a discrete fourier transform (DFT) on the signal of which CP has been removed and converts a signal of a time area into a signal of a frequency area in operation S120. The reception device may extract, from the signal of the frequency area, a signal of a frequency area to which a Zadoff-Chu permutation has been assigned in operation S125. The reception device calculates decorrelation between the extracted signal of the frequency area and a Zadoff-Chu permutation of a reference signal in operation S130. Here, calculating the decorrelation refers to an operation of performing conjugate multiplication on two DFT outputs in a sample-by-sample manner.

The reception device performs a Nzc-Point inverse discrete fourier transform (IDFT) on an output of decorrelation and converts the output of the decorrelation into a signal of a time area again in operation S135. The reception device may acquire a peak value from the above-mentioned IDFT output in operation S140. The IDFT output may be calculated in a graph of which a horizontal axis is time, and of which a vertical axis is a signal value. The length of the time of the horizontal axis is $N_{zc}$ which is the length of the Zadoff-Chu permutation, the interval of Nzc is $$\left[-\frac{N_{zc}}{2}, \frac{N_{zc}}{2}\right].$$

The reception device acquires a peak value (i.e. a maximum value) among signal values which exist within specific intervals (i.e. a window interval) centered on zero, +P, and −P of the time of the horizontal axis in the IDFT output. The P corresponds to the smallest integer value P which is equal to or larger than 0 and satisfies a modulo calculation, (pu)mod $N_{zc}$=1. Further, when considering a cyclic time-shift according to the calculation result, the P may be configured as p=$N_{zc}$+1/u. In the IDFT output converted into the time area, since the range of the horizontal axis is $$\left[-\frac{N_{zc}}{2}, \frac{N_{zc}}{2}\right],$$

and the reference point thereof is 0, the P is configured as P=1/u. The reception device may estimate a frequency offset using the acquired maximum value in operation S145.

A method of the present disclosure is able to estimate a frequency offset because of a characteristic of the Zadoff-Chu permutation. In more detail, a u-th root Zadoff-Chu sequence in which a length is $N_{zc}$ in a time area and the root index is u is defined by Equation 2 as follows.

$$x_u(n) = e^{-j\frac{\pi u n(n+1)}{N_{ZC}}}, 0 \leq n \leq N_{ZC} - 1 \quad \text{Equation 2}$$

Taking a DFT on a signal $x_u(n)$ of a time area is defined by Equation 3 as follows.

$$X_u(k) = \sum_{n=0}^{N_{ZC}-1} e^{-j\frac{\pi u n(n+1)}{N_{ZC}}} e^{-j\frac{2\pi n k}{N_{ZC}}} \quad \text{Equation 3}$$

A discrete-time fourier transform (DTFT) and a DFT are connected by Equation 4 as follows.

$$X_u\left(f = \frac{k}{N_{ZC}}\right) = X_u(k) \quad \text{Equation 4}$$

Here, the DTFT is defined by Equation 5 as follows.

$$X_u(f) = \sum_{n=0}^{N_{ZC}-1} e^{-j\frac{\pi u n(n+1)}{N_{ZC}}} e^{-j 2\pi f n} \quad \text{Equation 5}$$

In order to easily describe Equation 5 in the present disclosure, an additive white gaussian noise (AWGN) channel may assume that there is no noise, and only a frequency offset exists. In terms of a characteristic for a channel, the AWGN channel refers to a channel in which a noise is simply added on a signal, a power spectrum density is constant throughout all frequencies, an average of a signal is 0, and autocorrelation is not affected by movement on a time axis. In the AWGN channel, a reception signal $Y_u(f)$ in which there is no noise and only a frequency offset exists may be defined by Equation 6 as follows with regard to a reference signal $X_u(f)$.

$$Y_u(f) = X_u(f - \delta f) = \sum_{n=0}^{N_{ZC}-1} e^{-j\frac{\pi u n(n+1)}{N_{ZC}}} e^{-j2\pi(f-\delta f)n} = \quad \text{Equation 6}$$

$$\sum_{n=0}^{N_{ZC}-1} \left( e^{-j\frac{\pi u n(n+1)}{N_{ZC}}} e^{j2\pi\delta f n} \right) e^{-j2\pi f n}$$

Performing an inverse discrete-time fourier transform (IDTFT) on the reception signal $Y_u(f)$ to obtain Yu(n) is defined by Equation 7 as follows.

$$Y_u(f) = X_u(f - \delta f) \xrightarrow{DIFT\ pair} x_u(n) e^{j2\pi\delta f n} = y_u(n) \quad \text{Equation 7}$$

That is, an offset $\delta f$ of a frequency area is present in the form of being multiplied by an exponent $e^{j2\pi\delta A}$ in a time area. Modifying a formula for the time area signal on which the IDTFT has been performed by substituting Equation 1 for estimating the frequency offset $\delta f$ is defined by Equation 8 as follows.

$$y_u(n) = e^{-j\frac{\pi u n(n+1)}{N_{ZC}}} e^{j2\pi\delta f n} \quad \text{Equation 8}$$

$$= e^{-j\frac{2\pi}{N_{ZC}}\left(\frac{u n(n+1)}{2} - N_{ZC}\delta f n\right)}$$

$$= e^{-j\frac{2\pi}{N_{ZC}}\left(\frac{u}{2}\left(n(n+1) - \frac{2}{u}N_{ZC}\delta f n\right)\right)}$$

$$= e^{-j\frac{\pi u}{N_{ZC}}\left(n^2 + n - \frac{2N_{ZC}\delta f}{u}\right)}$$

$$= e^{-j\frac{\pi u}{N_{ZC}}\left(\left(n - \frac{N_{ZC}\delta f}{u}\right)\left(n - \frac{N_{ZC}\delta f}{u} + 1\right) - \left(\frac{N_{ZC}\delta f}{u}\right)^2 + \frac{N_{ZC}\delta f}{u}\right)}$$

$$= x_u\left(n - \frac{N_{ZC}\delta f}{u}\right) e^{j\frac{\pi u}{N_{ZC}}\left(\left(\frac{N_{ZC}\delta f}{u}\right)^2 - \frac{N_{ZC}\delta f}{u}\right)}$$

In Equation 8 above, if it is assumed that the frequency offset $\delta f$ has a difference to the extent of one frequency index, that is, $\delta f = \pm(1/N_{zc})$, the frequency offset is defined by Equation 9 as follows.

$$y_u(n) = x_u\left(n \mp \frac{1}{u}\right) e^{j\frac{\pi}{N_{ZC}}\left(\frac{1 \mp u}{u}\right)} \quad \text{Equation 9}$$

$$= A(u) x_u\left(n \mp \frac{1}{u}\right)$$

Here, since $|A(u)|=1$ and $A(u)$ is a constant value determined according to a reference index u of the Zadoff-Chu sequence, $A(u)$ is an ignorable item in an operation of the present disclosure using an absolute value.

An operation of performing an IDFT after taking decorrelation of the converted two signals of the frequency area in operation S130 of FIG. 1 above corresponds to a circular convolution of the two signals in a time area. The circular convolution of the two signals xn(n) and h(n) of the time area is defined by Equation 10 as follows.

$$(x_N * h)[n] \stackrel{def}{=} \quad \text{Equation 10}$$

$$\sum_{m=-\infty}^{\infty} h[m] \cdot x_N[n-m] = \sum_{m=-\infty}^{\infty} \left( h[m] \times \sum_{k=-\infty}^{\infty} x[n-m-kN] \right)$$

Thus, Equation 9 and Equation 10 show that a peak value is generated in one of $+(1/u)$ and $-1(1/u)$ of the IDFT output when a frequency offset has a difference to the extent of one frequency index. When the above-mentioned case is divided into two cases, one case where a positive frequency offset exists corresponds to $x_u(n+1/u)$. Thus, a peak value is generated in $+(1/u)$ of the IDFT output, which implies that a reception signal has a cyclic time-shift to the right as compared to a reference signal. The other case where a negative frequency offset exists corresponds to xu(n+1/u). Thus, a peak value is generated in $-(1/u)$ of the IDFT output, which implies that the reception signal has a cyclic time-shift to the left. If not the frequency offset having a difference to the extent of one frequency index but a fractional frequency offset exists, a signal ingredient may simultaneously exist in signal outputs $-(1/u)$, zero, and $+(1/u)$ of the IDFT.

Figure 2:
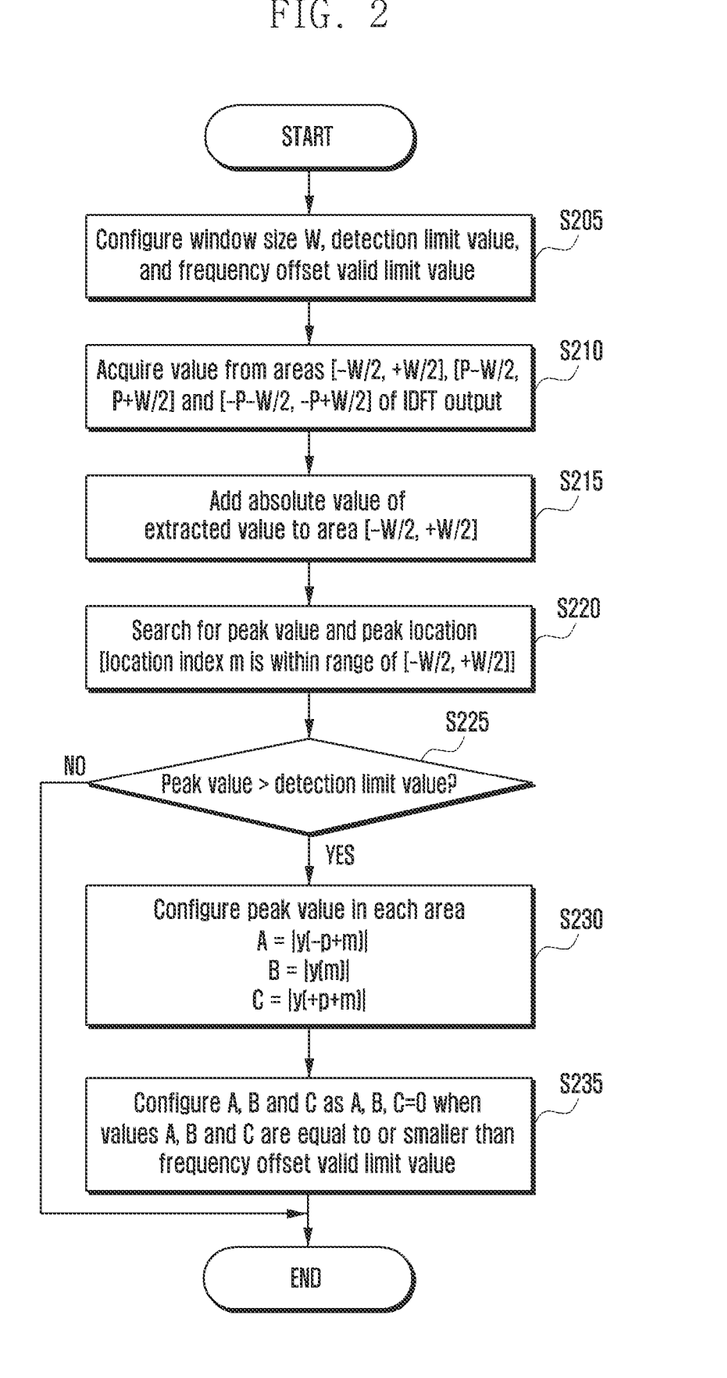
FIG. 2 is a flowchart of a process of acquiring a peak value according to an embodiment of the present disclosure.

FIG. 2 is a flowchart of a process of acquiring a peak value according to an embodiment of the present disclosure.

Figure 3:
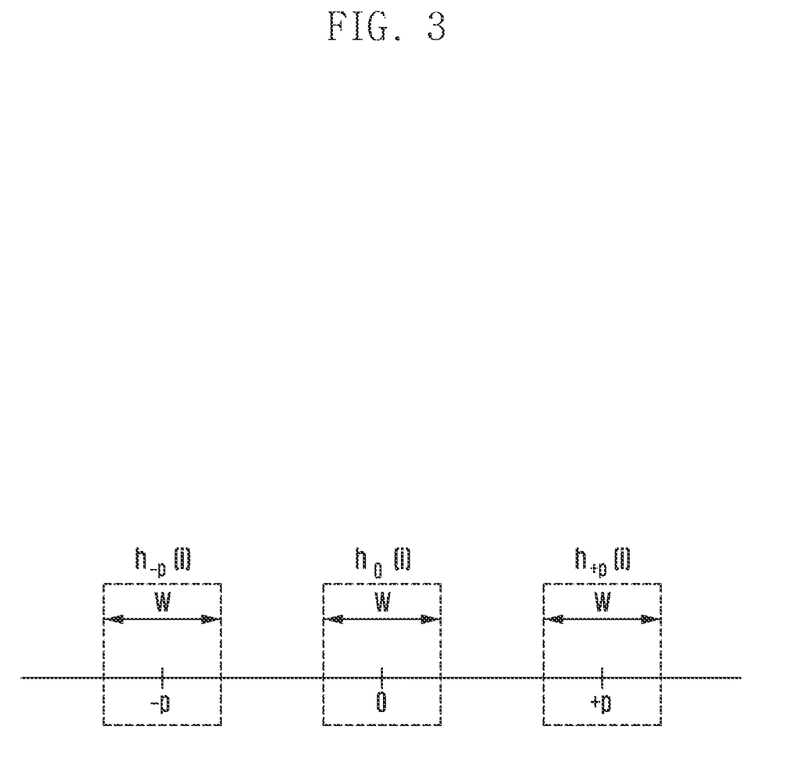
FIG. 3 is a view describing a process of acquiring a peak value according to an embodiment of the present disclosure.

FIG. 3 is a view describing a process of acquiring a peak value according to an embodiment of the present disclosure.

Referring to FIG. 2, the reception device can configure a window size W, a detection limit value, and a valid limit value of a frequency offset in operation S205. The reception device can acquire a peak value in time areas [−W/2, +W/2], [P−W/2, P+W/2] and [−P−W/2, −P+W/2] of the IDFT output shown in operation S135 of FIG. 1 in operation S210. As mentioned above, the P may be configured as $P=N_{zc}+1/u$. When zero is referred to as a first value and P is referred to as a second value, the reception device can acquire a peak value in one interval centered on the first value, the second value, the negative second value.

Referring to FIG. 3, a time area determined for acquiring the peak value is specifically illustrated. A window (W) interval centered on a P value is determined in consideration of a multi-path effect caused by a delay profile of a channel from which the reception device receives a signal. That is, by applying the W, the reception device acquires a peak value in consideration of only signal values of the ±W/2 intervals on the basis of −P, zero and +P. By restricting the reception device from acquiring the peak value in the area only, the reception device does not have to detect a peak value in a broad area. Thus, there is an effect of raising efficiency of an operation and quickening a processing speed.

The reception device can add the extracted absolute value to the area [−W/2, +W/2] in operation S215. The reception device brings the absolute value of the W interval centered on −P and the absolute value of the W interval centered on +P into the W interval centered on zero and adds up the absolute values of the three intervals. When adding up the absolute values of the three intervals, the reception device can add up the absolute values of the three intervals for an index mutually corresponding to each of intervals having the same length. The reception device brings the above-mentioned two absolute values into the W interval centered on zero and adds up the absolute values of the three intervals, thereby acquiring a peak value in operation S220. Further, the reception device searches for a peak location in which the added peak value exists and configures the peak location as a location index m.

The reception device determines whether the peak value obtained by adding up the absolute values is equal to or larger than the detection limit value in operation S225. The detection limit value is a value preconfigured as a threshold value for determining whether a signal is transmitted. That is, the reception device can determine whether the signal has been transmitted only when the peak value obtained by adding up the absolute values is equal to or larger than the threshold value. That is to say, the reception device determines whether to transmit a signal on the basis of the threshold value so that unnecessarily performing a frequency offset estimation process for a signal which is not a reception signal may be prevented.

The reception device can set a peak value in each of the areas in operation S230. That is, the reception device configures a location corresponding to a location index m in the interval centered on −p, that is, an absolute value of a signal value corresponding to −p+m, as A on the basis of the configured location index m. Further, the reception device configures an absolute value of a signal value corresponding to m, which is a location corresponding to the location index m, in the interval centered on zero, as B. Finally, the reception device configures an absolute value corresponding to p+m, which corresponds to a location index m, in the interval centered on +p, as C.

The reception device configures the values A, B and C to be zero when the values A, B and C are equal to or less than a frequency offset valid value in operation S235. The frequency offset valid value refers to a limit value for additionally distinguishing an ingredient caused by a noise and a signal ingredient. Here, the frequency offset valid value may be configured to be smaller than one third of the detection limit value. Since the reception device already checks whether to transmit a signal through the detection limit value, at least one value among the values A, B and C cannot help being larger than one third of the detection limit value. Because, the total of the values A, B and C cannot pass the detection limit value when all of the values A, B and C are smaller than one third of the detection limit value. Thus, when the frequency offset valid value is configured to be smaller than one third of the detection limit value, all of the values A, B and C are detected as a noise so that configuring A, B and C to be zero may be prevented. Thus, the reception device can detect noise after determining that a signal is received because the total value of the values A, B and C is larger than the detection limit value through the frequency offset valid value, which enables more precise frequency offset estimation.

After that, the reception device returns to operation S145 of FIG. 1 and estimates a frequency offset. The reception device can estimate a frequency offset (FO) using Equation 11 as follows after comparing the values of A and C and selecting a larger value among the values.

$$FO = \frac{(1/T_{SEQ})C}{B+C} \text{ if } A < C \quad \text{Equation 11}$$

$$FO = \frac{-(1/T_{SEQ})A}{A+B} \text{ if } A > C$$

In the exceptional case where A=C, FO is processed as FO=0 Hz.

Figure 4:
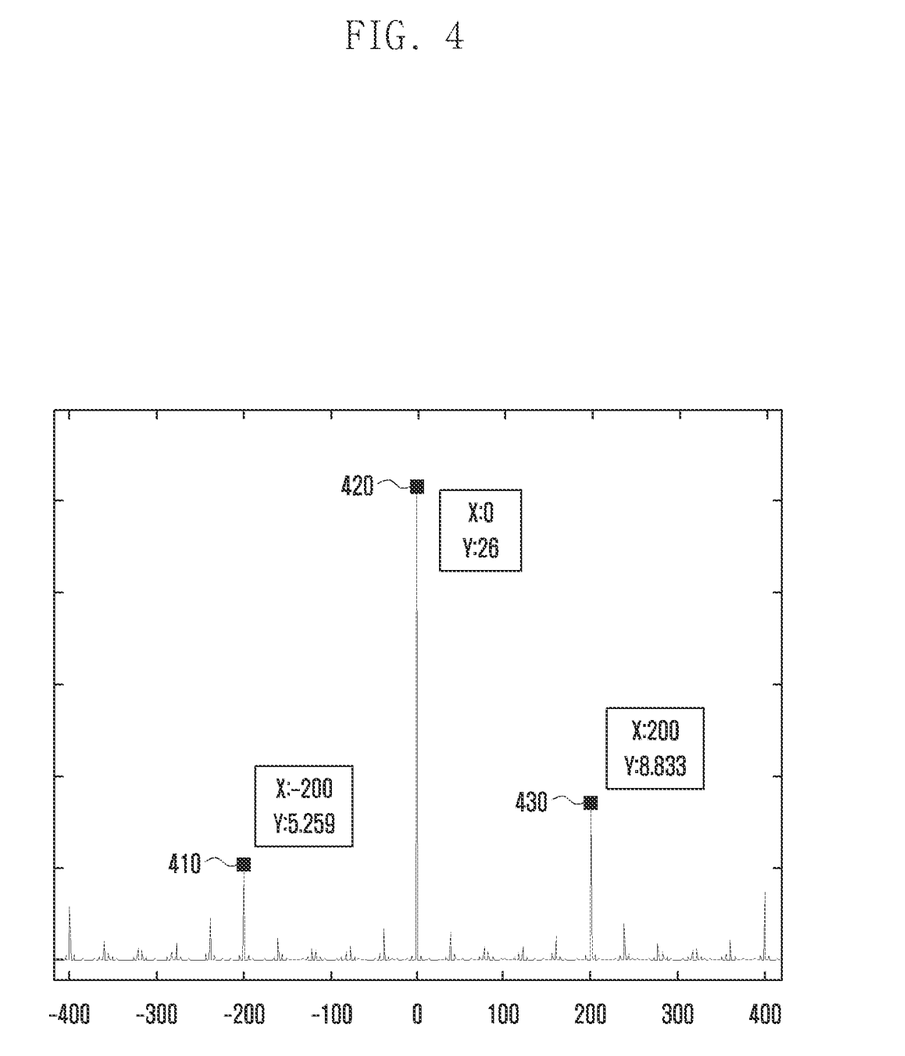
FIG. 4 is a view describing a method for estimating a frequency offset according to an embodiment of the present disclosure.

FIG. 4 is a view describing a method for estimating a frequency offset according to an embodiment of the present disclosure.

Referring to FIG. 4, as mentioned above, a Zadoff-Chu sequence, which is a permutation used in the present disclosure, is widely used for LTE mobile communication, and is used representatively for a physical random access channel (PRACH) preamble signal of a random access procedure. Hereinafter, a frequency offset estimation process for the PRACH preamble signal will be described as an embodiment of the above-described present disclosure. FIG. 4 is a result caused by assuming that there is no interference among channels for convenience of description, and a frequency area signal level of the preamble signal is one for each sub-carrier in a single path environment. In an actual channel environment, a different result may be obtained according to a signal-to-noise ratio (SNR) of a preamble signal.

In a PRACH, $T_{SEQ}$=0.8 m sec, u=172, and p=200, and a signal is generated so that a 317 $H_z$ frequency offset, which is a predetermined value, exists between a reference signal and a reception signal in a channel environment in which only a single path exists without a noise. In the present disclosure, an absolute value of a signal value on which an IDFT conversion has been performed after decorrelation was taken according to a method for estimating a frequency offset is illustrated in FIG. 4. Since the p value is 200, the reception device can acquire a peak value when the p value is 0, 200 and −200 as mentioned above.

As mentioned above, the values A, B and C are acquired as A=5.259, B=26, and C=8.833 through a process of obtaining an absolute value of the peak value of the signal value on which the IDFT conversion has been performed. An inequation is A<C. Thus, when the inequation is substituted with Equation 10, FO=1250*8.833/(26+8.833) =316.98 Hz. Accordingly, the above-mentioned equality shows that a frequency offset corresponding to the predetermined 317 Hz frequency offset may be estimated.

Further, the present disclosure has a characteristic in that not power of the IDFT output, that is, a squared value of a signal, but an absolute value is used. When FO is calculated by using power of the values, FO=1250*8.833²/(26²+ 8.833²)=129.34 $H_z$. Thus, an error of an estimation value of a frequency offset is largely generated. Accordingly, using not a squared value of a signal but an absolute value, accuracy of frequency offset estimation may be raised.

When the values A, B and C are theoretically calculated reversely on the basis of the estimated frequency offset value in order to identify accuracy of a frequency offset estimation method of the present disclosure, the relevant equations are defined by Equation 12.

$$A = \left|\sqrt{N_{ZC}} \frac{\sin(\pi(-1-FO \cdot T_{SEQ}))}{\pi(-1-FO \cdot T_{SEQ})}\right|_{실제예리값} = \quad \text{Equation 12}$$

$$\left|\sqrt{839} \frac{\sin\left(\pi\left(-1-\frac{317}{1250}\right)\right)}{\pi\left(-1-\frac{317}{1250}\right)}\right| = 5.259$$

$$B = \left|\sqrt{N_{ZC}} \frac{\sin(\pi(0-FO \cdot T_{SEQ}))}{\pi(0-FO \cdot T_{SEQ})}\right|_{실제예리값} =$$

$$\left|\sqrt{839} \frac{\sin\left(\pi\left(0-\frac{317}{1250}\right)\right)}{\pi\left(0-\frac{317}{1250}\right)}\right| = 25.997$$

-continued $$C = \left| \sqrt{N_{ZC}} \frac{\sin(\pi(+1 - FO \cdot T_{SEQ}))}{\pi(+1 - FO \cdot T_{SEQ})} \right|_{\text{대체예적용}} =$$

$$\left| \sqrt{839} \frac{\sin\left(\pi\left(+1 - \frac{317}{1250}\right)\right)}{\pi\left(+1 - \frac{317}{1250}\right)} \right| = 8.833$$

As a result, Equation 12 shows that the values A, B and C acquired in the above-mentioned equations are very approximate to the values calculated in Equation 11 above.

Through the present disclosure, the reception device can estimate a frequency offset of a reception signal more efficiently. Further, when the reception device uses the estimated frequency offset value later, reception performance may be expected to be additionally improved. First, like an interference rejection combining (IRC) operation through channel estimation after signal detection, when a second operation-based algorithm is applied, the reception device can estimate a channel by preferentially compensating for a frequency offset through the present disclosure to apply the second operation-based algorithm to the IRC operation. As shown in Equation 13 below, a user equipment velocity v may be estimated from the estimated frequency offset.

$$v = c f_d / f_c \qquad \text{Equation 13}$$

Here, fd denotes a frequency offset, fc denotes a frequency of a carrier, and c denotes a speed of a light. The present disclosure has an advantage in that more available resources may be secured by allowing the reception device to estimate the distribution of a user equipment velocity throughout a cell and change a cell mode into a high-speed set. For example, even though a PRACH restricted set, that is, a high-speed set is subjected to an identical zero correlation zone config in an LTE system, a value of $N_{cs}$ is defined to be relatively larger than an unrestricted set. Thus, more root sequences are required.

Figure 5:
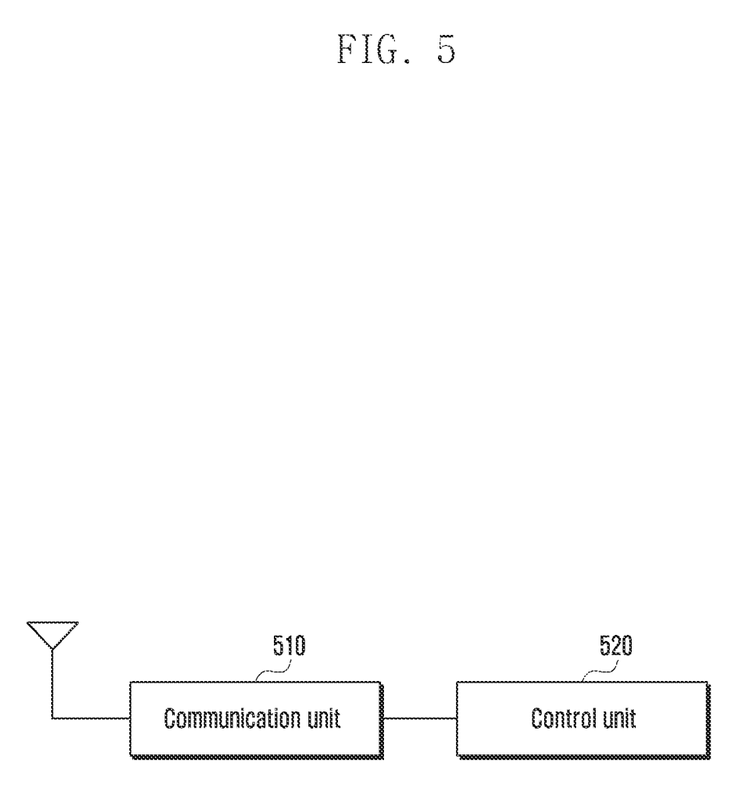
FIG. 5 is a block diagram illustrating an internal structure of a reception device estimating a frequency offset according to an embodiment of the present disclosure.

FIG. 5 is a block diagram illustrating an internal structure of a reception device estimating a frequency offset according to an embodiment of the present disclosure.

Referring to FIG. 5, the reception device may include a communication unit 510 and a control unit 520.

The communication unit 510 can be connected to the control unit 520, and transmit or receive information required for estimating a frequency offset. The communication unit 510 can receive, from a transmission device, a signal in which a frequency offset is to be estimated.

The control unit 520 can receive, from the communication unit 510, signals in which a frequency offset is to be estimated. The control unit 520 can determine a correlation relationship between the reception signal and a reference signal in a time area, acquire a predetermined maximum value of at least one interval from a spectrum on the basis of the determined correlation relationship, and control to estimate a frequency offset on the basis of the acquired maximum value.

Further, when determining the correlation relationship between the reception signal and the reference signal of the time area, the control unit 520 can convert the reception signal and the reference signal in the time area into signals of a frequency area, extract predetermined permutations from the converted signals of the frequency area, acquire a spectrum on the basis of a correlation relationship between the predetermined extracted permutations of the reception signal and the reference signal, and convert the acquired spectrum of the correlation relationship into a time area. Also, when extracting a predetermined permutation from the converted signals of the frequency area, the control unit 520 can extract the Zadoff-Chu permutation.

Also, when acquiring a maximum value of the spectrum on the basis of the correlation relationship, the control unit 520 can acquire maximum values in time intervals centered on a first value, a second value and a negative second value, determine whether the total of the acquired maximum values is equal to or larger than a detection limit value, and compensate for the predetermined maximum values in the intervals centered on the second value and negative second value on the basis of the acquired total of the maxim values.

Also, when the acquired maximum values in the interval centered on zero and the compensated maximum values in the intervals centered on the second value and negative second value are equal to or smaller than a frequency offset valid value, the control unit 520 can assign zero to the maximum values.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for estimating a frequency offset of a reception signal by a reception device, the method comprising:
   determining a correlation relationship between the reception signal and a reference signal in a time domain;
   acquiring a first absolute value in a first time interval centered on a first value in the time domain, a second absolute value in a second time interval centered on a second value in the time domain, and a third absolute value in a third time interval centered on a negative of the second value, the first value and the second value being set based on time values of a predetermined permutation;
   acquiring a maximum value by adding the first absolute value, the second absolute value, and the third absolute value;
   determining whether the maximum value is greater than a detection limit value; and
   when the maximum value is greater than the detection limit value, calculating the frequency offset based on absolute values corresponding to a position index in each of the first time interval, the second time interval, and the third time interval,
   wherein the absolute values corresponding to the position index are assigned to zero when each of the absolute values corresponding to the position index are equal to or smaller than a frequency offset valid value.

2. The method of claim 1, wherein the determining of the correlation relationship between the reception signal and the reference signal comprises:
   converting the reception signal and the reference signal in the time domain into signals of a frequency domain;
   extracting predetermined permutations from the converted signals of the frequency domain;
   acquiring a spectrum on a basis of the correlation relationship between the predetermined extracted permutations of the reception signal and the reference signal; and
   converting the acquired spectrum of the correlation relationship into the time domain.

3. The method of claim 2, wherein the predetermined permutation comprises a Zadoff-Chu sequence.

4. The method of claim 1, wherein the first time interval, the second time interval, and the third time interval are configured to consider a multi-path effect caused by a delay profile of a channel for receiving the reception signal, on a basis of the time values of the predetermined permutation.

5. The method of claim 1, further comprising:
comparing sizes of a fourth absolute value corresponding to the maximum value in the second time interval centered on the second value and a fifth absolute value corresponding to the maximum value in the third time interval centered on the negative second value; and
calculating the frequency offset using a larger value among the fourth absolute value and the fifth absolute value.

6. The method of claim 1, wherein the frequency offset valid value is less than one third of the detection limit value.

7. A reception device for estimating a frequency offset of a reception signal in a mobile communication system, the reception device comprising:
a storage configured to hold instructions therein;
a transceiver; and
at least one processor,
wherein upon execution of the instructions, the at least one processor is configured to:
use the transceiver to receive a reception signal from a transmission device,
determine a correlation relationship between the reception signal and a reference signal in a time domain,
acquire a first absolute value in a first time interval centered on a first value in the time domain, a second absolute value in a second time interval centered on a second value in the time domain, and a third absolute value in a third time interval centered on a negative of the second value, the first value and the second value being set based on time values of a predetermined permutation,
acquire a maximum value by adding the first absolute value, the second absolute value, and the third absolute value,
determine whether the maximum value is greater than a detection limit value, and
when the maximum value is greater than the detection limit value, calculate the frequency offset based on the absolute values corresponding to a position index in each of the first time interval, the second time interval, and the third time interval, and
wherein the absolute values corresponding to the position index are assigned to zero when each of the absolute values corresponding to the position index are equal to or smaller than a frequency offset valid value.

8. The reception device of claim 7, wherein the determining of the correlation relationship between the reception signal and the reference signal comprises:
converting the reception signal and the reference signal in the time domain into a signal of a frequency domain;
extracting predetermined permutations from the converted signals of the frequency domain;
acquiring a spectrum on a basis of the correlation relationship between the predetermined extracted permutations of the reception signal and the reference signal; and
converting the acquired spectrum of the correlation relationship into the time domain.

9. The reception device of claim 8, wherein the predetermined permutation comprises a Zadoff-Chu sequence.

10. The reception device of claim 8, wherein the first time interval, the second time interval, and the third time interval are configured to consider a multi-path effect caused by a delay profile of a channel for receiving the reception signal, on the basis of the time values of the predetermined permutation.

11. The reception device of claim 9, wherein the at least one processor is further configured to:
compare sizes of a fourth absolute value corresponding to the maximum value in the second time interval centered on the second value and a fifth absolute value corresponding to the maximum value in the third time interval centered on the negative second value; and
calculate the frequency offset using a larger value among the fourth absolute value and the fifth absolute value.

12. The reception device of claim 7, wherein the frequency offset valid value is less than one third of the detection limit value.

* * * * *